No. 12,295. REISSUED DEC. 27, 1904.

A. C. E. RATEAU.

STEAM REGENERATIVE ACCUMULATOR.

APPLICATION FILED OCT. 10, 1904.

2 SHEETS—SHEET 1.

Inventor:
Auguste Camille Edmond Rateau
By G. L. Cragg
Attorney.

Attest:
Charles F. Barrett
Leon Stroh

No. 12,295. REISSUED DEC. 27, 1904.

A. C. E. RATEAU.

STEAM REGENERATIVE ACCUMULATOR.

APPLICATION FILED OCT. 10, 1904.

2 SHEETS—SHEET 2.

Witnesses:
Chas. F. Barrett
Leon Stroh

Inventor:
Auguste Camille Edmond Rateau
By G. L. Cragg
Attorney.

No. 12,295. Reissued December 27, 1904.

UNITED STATES PATENT OFFICE.

AUGUSTE CAMILLE EDMOND RATEAU, OF PARIS, FRANCE, ASSIGNOR TO SOCIÉTÉ D'EXPLOITATION DES APPAREILS RATEAU, OF PARIS, FRANCE.

STEAM-REGENERATIVE ACCUMULATOR.

SPECIFICATION forming part of Reissued Letters Patent No. 12,295, dated December 27, 1904.

Original No. 761,606, dated May 31, 1904. Application for reissue filed October 10, 1904. Serial No. 227,970.

*To all whom it may concern:*

Be it known that I, AUGUSTE CAMILLE EDMOND RATEAU, engineer, a citizen of the French Republic, residing at Paris, France, have invented certain new and useful Improvements in Steam-Regenerative Accumulators, of which the following is a specification.

This invention relates to improvements in steam-regenerative accumulators.

In my former patent, No. 679,242, I have shown how by means of solid and liquid materials, such as pig-iron and water, a steam-regenerative accumulator can be produced adapted to regulate a current of steam produced by the escape from a machine having an intermittent motion. Since that time I have improved my invention with a view to removing the solid materials, which, though not expensive, nevertheless considerably increase the price of fitting the apparatus.

As water has the greatest calorific capacity and costs nothing, it is natural that attempts should be made to utilize it as a heat-carrier to the exclusion of all other bodies. However, the water being a bad conductor of heat gives rise to the difficulty of communicating within a short time a very large quantity of heat produced by the steam to be condensed to a certain quantity of water.

In the device of my former patent sudden and forceful exhaustion of steam did not permit thorough intermingling of water and steam and would permit a large proportion of exhaust-steam under high pressure to evade the absorbing action of the water.

My present invention has for its purpose to overcome said difficulty; and it essentially consists in putting the water into a very active circulation in such a manner as to bring the steam into contact with its different elements and not only with its surface and to prevent large bodies of steam from passing without operative contact with the water. This object is accomplished substantially as will be hereinafter described, and pointed out in the appended claims.

Figure 1:
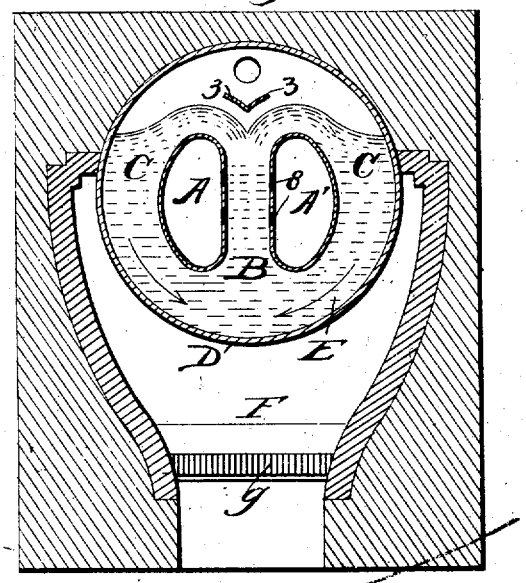
Figure 3:
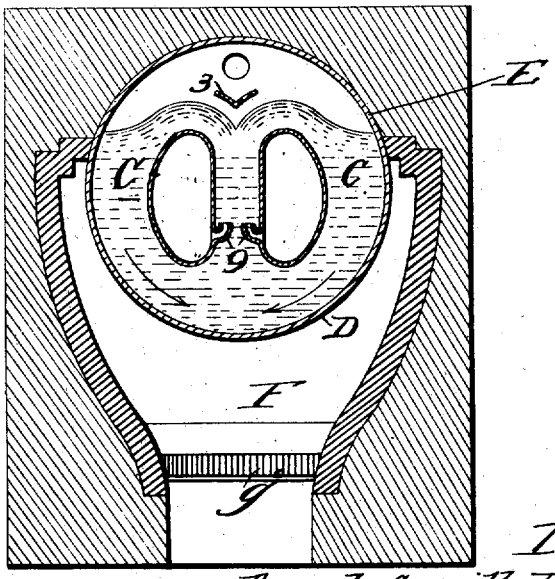
Figure 2:
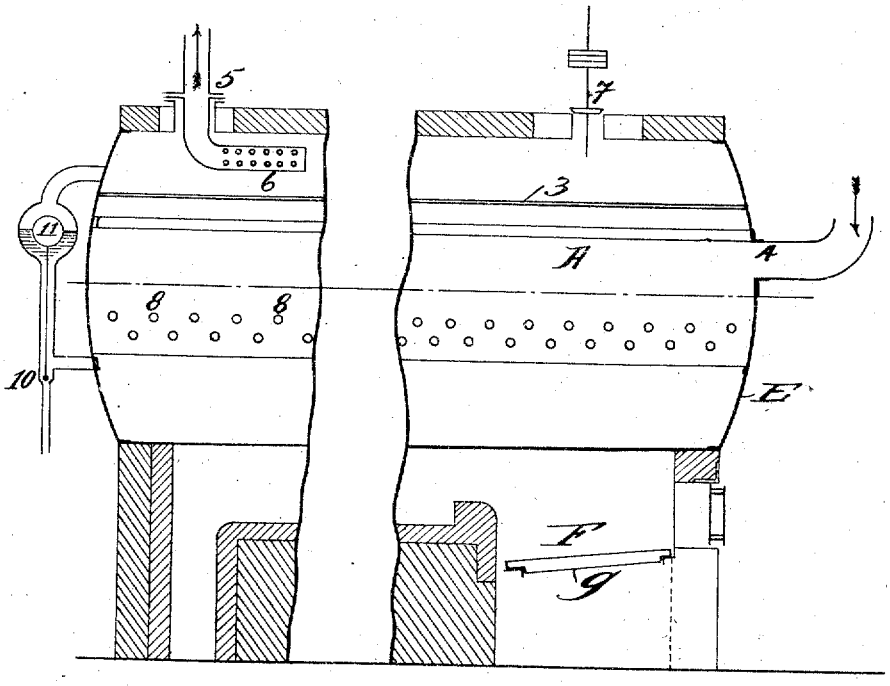

Referring to the annexed drawings, Figures 1 and 2 are two vertical sections of a boiler adapted to be used as a steam-regenerative accumulator according to my invention. Fig. 3 is a vertical section similar to Fig. 1, showing a modification.

As shown in the drawings, I use a horizontal cylindrical boiler E, filled to the greater part with water. In the interior of the boiler are arranged two horizontal pipes A A′, preferably of semicircular or substantially semicircular section. The said pipes A A′, which lead from one end of the boiler to the other, leave between them a central vertical space B, the breadth of which is about a sixth of the diameter of the cylindrical boiler. The steam passes into the pipes A A′ through an inlet-pipe 4, Fig. 2, and passes into the central shaft B through a large number of small circular or elliptical apertures 8 in said pipes, as shown in Figs. 1 and 2, or through small vertical or inclined tubes 9, Fig. 3, arranged all along the plates forming the side walls of the shaft B. The stream of steam thus escaping into the shaft B produces a strong motion of the liquid. The said steam passes upward in the central shaft and back to the foot thereof through the spaces C C between the pipes A A′ and the wall D of the boiler E. By this means a very energetic circulation of the water is obtained in the apparatus and all parts of the liquid are frequently brought into contact with the steam. Above the shaft is arranged a plate or plates 3 3, adapted to cause the liquid-current to pass horizontally and to prevent it being projected against the steam-valve tube 5 6, Fig. 2, above.

If preferred, the single central shaft B may be divided into several shafts of the same equivalent sections.

The apparatus is provided with a safety-valve 7 and an automatic blow through valve 10, which is raised by a float 11 when the interior water-level tends to exceed a predetermined point. The valve 7 acts to permit the escape of steam from within the vessel E. By means of this valve an undesirable increase in back pressure on the primary engine or engines is prevented. The valve is located above the upper water-level maintained by the valve 10.

Care must be taken to previously heat the water before admitting the steam into the apparatus, since if this were not done there would be a risk of severe impacts of water being produced by the rapid absorption of the steam by the cold liquid. For this purpose the boiler is provided with an auxiliary hearth F and grate *g*. The said hearth may also, if desired, be utilized in a permanent manner for vaporizing the quantity of water which the escaping steam always carries with it when passing from the engines or machines where it has been used.

Having thus described my invention, what I claim is—

1. In a steam-regenerative accumulator in combination a boiler containing water alone as heat-carrier, a steam-inlet pipe, pipes leading the steam from the inlet-pipe into the interior of the boiler, steam-outlets in the said pipes in order to discharge the steam into the water and plates adapted to direct the liquid-current, in the boiler substantially as described and for the purpose set forth.

2. In a steam-regenerative accumulator in combination a boiler containing water alone as heat-carrier adapted to regulate a current of steam produced by the escape from a machine having an intermittent motion a steam-inlet pipe, pipes A A′ leading the steam from the inlet-pipe in the interior of the boiler, a vertical shaft between the said pipes, steam-outlets adapted to discharge the steam from the pipes into the water so as to condense said steam partly in the water and to put said water into active circulation around the pipes A A′ plates adapted to direct the liquid-current, and a steam-valve tube conducting the regularly-generated steam to a motor, substantially as described and for the purpose described.

3. In a steam-regenerative accumulator in combination, a boiler containing water alone as heat-carrier adapted to regulate an intermittent current of steam produced by the escape from a machine a steam-inlet pipe, pipes A A′ extending longitudinally in the boiler and leading the intermittent current of steam from the inlet-pipe in the interior of the boiler, a vertical shaft formed between the said pipes A A′, steam-outlets in the said pipes A A′ in order to discharge the intermittent current of steam in the water and to put the said water into active circulation around the pipes A A′, plates adapted to direct the liquid-current, a steam-valve tube conducting the regulated current of steam to a motor, a safety-valve and an auxiliary hearth for the preliminary heating of the heat-carrier, substantially as described and for the purpose set forth.

4. In a steam-regenerative accumulator in combination, a vessel containing liquid as a heat-carrier, piping within the liquid and conveying steam thereto, said piping being in two sections A A′ having a vertical space B intervening between the same, said pipe-sections having openings or perforations serving to direct steam into the water to effect circulation of the liquid between said pipe-sections, a discharge duct or opening for maintaining the liquid in the vessel from materially exceeding a given level by permitting the excess of liquid to flow away from the vessel, and a steam-escape valve 7, said vessel having an outlet above said level for conveying steam from the vessel, substantially as described.

5. In a steam-regenerative accumulator in combination, a vessel containing liquid as a heat-carrier, a steam-inlet pipe, piping within the portion of the vessel containing the liquid and leading the steam from the inlet into the liquid, said piping having steam-outlets discharging the steam into the liquid, a discharge duct or opening for substantially preventing the liquid from exceeding a given level by permitting the excess of liquid to flow away from the vessel, and a steam-escape valve 7, said vessel having an outlet above said level for conveying steam from the vessel, substantially as described.

6. In a steam-regenerative accumulator in combination, a vessel containing liquid as a heat-carrier, piping for directing steam into the liquid, a discharge duct or opening for substantially preventing the liquid from exceeding a given level by permitting the excess of liquid to flow away from the vessel, and a steam-escape valve 7, said vessel having an outlet above said level for conveying steam from the vessel, substantially as described.

In witness whereof I have hereunto set my hand in presence of two witnesses.

AUGUSTE CAMILLE EDMOND RATEAU.

Witnesses:

PAUL JOSEPH ALEXIS CHALEIL,
JOHN BAKER.